(12) United States Patent
Lee et al.

(10) Patent No.: US 7,675,942 B2
(45) Date of Patent: Mar. 9, 2010

(54) REDUCING OVERHEADS OF A PROTOCOL DATA UNIT IN A WIRELESS COMMUNICATION SYSTEM

(75) Inventors: Young Dae Lee, Kyoungki-do (KR); Sung Duck Chun, Anyang (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 11/146,986

(22) Filed: Jun. 6, 2005

(65) Prior Publication Data

US 2006/0007886 A1    Jan. 12, 2006

(30) Foreign Application Priority Data

Jun. 14, 2004    (KR)    ....................  10-2004-0043757

(51) Int. Cl.
*H04J 3/24*    (2006.01)
(52) U.S. Cl. ..................................... 370/474
(58) Field of Classification Search ................. 370/238, 370/329, 473, 784, 474
See application file for complete search history.

(56) References Cited

U.S. PATENT DOCUMENTS

| 5,930,265 | A | * | 7/1999 | Duault et al. ................ 370/473 |
| 6,614,810 | B1 | | 9/2003 | Lee et al. |
| 7,173,936 | B1 | * | 2/2007 | Semaan .................. 370/395.51 |
| 2003/0007517 | A1 | * | 1/2003 | Beckmann et al. .......... 370/537 |
| 2003/0131124 | A1 | * | 7/2003 | Yi et al. ...................... 709/236 |
| 2004/0151154 | A1 | * | 8/2004 | Wu ............................. 370/349 |
| 2004/0196870 | A1 | * | 10/2004 | Cheng et al. ................ 370/470 |
| 2005/0180371 | A1 | * | 8/2005 | Malkamaki .................. 370/342 |
| 2005/0185608 | A1 | * | 8/2005 | Lee et al. .................... 370/328 |
| 2006/0187844 | A1 | * | 8/2006 | Chun et al. ................. 370/242 |

FOREIGN PATENT DOCUMENTS

| EP | 0 991 208 A2 | 4/2000 |
| EP | 991208 A2 * | 4/2000 |
| JP | 2005-536168 | 11/2005 |
| KR | 1019990022314 | 3/1999 |
| KR | 1020000023147 | 4/2000 |
| KR | 1020010002494 | 1/2001 |
| KR | 10-2004-0040725 A | 5/2004 |
| RU | 2204218 | 5/2004 |
| WO | 0016435 | 3/2000 |
| WO | 01/63857 | 8/2001 |
| WO | 02/096030 | 11/2002 |
| WO | WO 2004/042952 A1 | 5/2004 |
| WO | WO 2004/042964 A1 | 5/2004 |

* cited by examiner

*Primary Examiner*—Derrick W Ferris
*Assistant Examiner*—Omar Ghowrwal
(74) *Attorney, Agent, or Firm*—Lee, Hong, Degerman, Kang & Waimey

(57) ABSTRACT

The present invention relates to transmitting data units of a radio protocol layer, wherein one logical channel identifier is added to one or more data units belonging to one logical channel. Because only one logical channel identifier is added to the data units belonging to one logical channel in constructing a MAC-e PDU, overheads of the MAC-e PDU are reduced. Such reduction of the PDU overheads increases data throughput, which is advantageous for a high-speed data communication system, such as the HSUPA.

18 Claims, 9 Drawing Sheets

REDUCING OVERHEADS OF A PROTOCOL DATA UNIT IN A WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Application No. 2004-0043757, filed on Jun. 14, 2004, the contents of which is hereby incorporated by reference herein in its entirety.

FIELD OF THE INVENTION

The present invention relates to a medium access control (MAC) layer of a mobile communications system and, more particularly, to a system and method for configuring data of the MAC layer.

BACKGROUND OF THE INVENTION

A universal mobile telecommunications system (UMTS) is a third-generation mobile communications system evolving from a global system for mobile communications system (GSM), which is the European standard. The UMTS is aimed at providing enhanced mobile communications services based on the GSM core network and wideband code-division multiple-access (W-CDMA) technologies.

In December 1998, ETSI of Europe, ARIB/TTC of Japan, T1 of the United States, and TTA of Korea formed a Third Generation Partnership Project (3GPP) for creating detailed specifications of the UMTS technology. Within the 3GPP, in order to achieve rapid and efficient technical development of the UMTS, five technical specification groups (TSG) have been created for determining the specification of the UMTS by considering the independent nature of the network elements and their operations.

Each TSG develops, approves, and manages the specification within a related region. Among these groups, the radio access network (RAN) group (TSG-RAN) develops the specifications for the functions, requirements, and interface of the UMTS terrestrial radio access network (UTRAN), which is a new radio access network for supporting W-CDMA access technology in the UMTS.

A related art UMTS network structure 1 is illustrated in FIG. 1. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality base stations, or Node Bs 12. The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit a downlink signals to the UE 2. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example, 3GPP specifications. These layers are based on the lower three layers of an open system interconnection (OSI) model that is well known in communications systems.

A related art architecture of the radio interface protocol is illustrated in FIG. 2. As shown, the radio interface protocol is divided horizontally into a physical layer, a data link layer, and a network layer, and is divided vertically into a user plane for carrying data traffic such as voice signals and Internet protocol packet transmissions and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

The second layer includes a MAC layer, a radio link control (RLC) layer, a broadcast/multicast control (BMC) layer and a packet data convergence protocol (PDCP) layer. The MAC layer maps various logical channels to various transport channels. The MAC layer also multiplexes logical channels by mapping several logical channels to one transport channel. The MAC layer is connected to an upper RLC layer via the logical channel. The logical channel can be divided into a control channel for transmitting control plane information and a traffic channel for transmitting user plane information according to the type of information transmitted.

The MAC layer is divided into a MAC-b sublayer, a MAC-d sublayer, a MAC-c/sh sublayer, a MAC-hs sublayer and a MAC-e sublayer according to the type of transport channel being managed. The MAC-b sublayer manages a broadcast channel (BCH), which is a transport channel handling the broadcast of system information. The MAC-c/sh sublayer manages common transport channels such as an FACH (Forward Access Channel) or a DSCH (Downlink Shared Channel) that is shared by other terminals. The MAC-d sublayer handles the managing of a DCH (Dedicated Channel), namely, a dedicated transport channel for a specific terminal. In order to support uplink and downlink high speed data transmissions, the MAC-hs sublayer manages an HS-DSCH (High Speed Downlink Shared Channel), namely, a transport channel for high speed downlink data transmission, and the MAC-e sublayer manages an E-DCH (Enhanced Dedicated Channel), namely, a transport channel for high speed uplink data transmissions.

The RLC layer guarantees a quality of service (QoS) of each radio bearer (RB) and handles the transmission of corresponding data. The RLC layer includes one or two independent RLC entities for each RB in order to guarantee a particular QoS of each RB. The RLC layer also provides three RLC modes, namely, a Transparent Mode (TM), an Unacknowledged Mode (UM) and an Acknowledged Mode (AM), to support various types of QoS. Also, the RLC controls the size of data to be suitable for a lower layer in transmitting over a radio interface. For this purpose, the RLC segments and concatenates the data received from the upper layer.

A PDCP (Packet Data Convergence Protocol) layer is a higher layer of the RLC layer and allows the data transmitted through a network protocol (such as an IPv4 or IPv6) to be effectively transmitted over a radio interface with a relatively small bandwidth. To achieve this, the PDCP layer performs a header compression function wherein only necessary information is transmitted in a header part of the data to thereby increase transmission efficiency over the radio interface. Because the PDCP layer performs the header compression as a basic function, it exists only at a packet switched (PS) domain. One PDCP entity is provided per RB to provide an effective header compression function with respect to each PS service.

A BMC (Broadcast/Multicast Control) layer, located at an upper portion of the RLC layer in the second layer (L2), schedules a cell broadcast message and broadcasts the message to terminals located in a specific cell.

A radio resource control (RRC) layer located at the lowest portion of the third layer (L3) is defined in the control plane and controls the parameters of the first and second layers with respect to the establishment, reconfiguration and release of RBs. The RRC layer also controls logical channels, transport channels and physical channels. Here, the RB refers to a logical path provided by the first and second layers of the radio protocol for data transmission between the terminal and the UTRAN. In general, the establishment of the RB refers to stipulating the characteristics of a protocol layer and a channel required for providing a specific data service, and setting their respective detailed parameters and operation methods.

An HSUPA (High Speed Uplink Packet Access) will now be described in detail. The HSUPA is a system allowing a terminal or UE to transmit data to the UTRAN via the uplink at a high speed. The HSUPA employs an enhanced dedicated channel (E-DCH), instead of the related art dedicated channel (DCH), and also uses an HARQ (Hybrid ARQ) and AMC (Adaptive Modulation and Coding), required for high-speed transmissions, and a technique such as a Node B-controlled scheduling.

For the HSUPA, the Node B transmits to the terminal downlink control information for controlling the E-DCH transmission of the terminal. The downlink control information includes response information (ACK/NACK) for the HARQ, channel quality information for the AMC, E-DCH transmission rate allocation information for the Node B-controlled scheduling, E-DCH transmission start time and transmission time interval allocation information, transport block size information, and the like.

The terminal transmits uplink control information to the Node B. The uplink control information includes E-DCH transmission rate request information for Node B-controlled scheduling, UE buffer status information, UE power status information, and the like. The uplink and downlink control information for the HSUPA is transmitted via a physical control channel such as an E-DPCCH (Enhanced Dedicated Physical Control Channel).

For the HSUPA, a MAC-d flow is defined between the MAC-d and MAC-e. Here, a dedicated logical channel such as a DCCH (Dedicated Control Channel) or a DTCH (Dedicated Traffic Channel) is mapped to the MAC-d flow. The MAC-d flow is mapped to the transport channel E-DCH and the transport channel E-DCH is mapped to the physical channel E-DPDCH (Enhanced Dedicated Physical Data Channel). The dedicated logical channel can also be directly mapped to the transport channel DCH. In this case, the DCH is mapped to the physical channel DPDCH (Dedicated Physical Data Channel). Such inter-channel mapping relationships are shown in FIG. 3.

The MAC-d sublayer will now be described in detail. A transmitting side MAC-d sublayer forms a MAC-d PDU (Protocol Data Unit) from a MAC-d SDU received from the upper layer, such as the RLC layer. A receiving side MAC-d sublayer restores the MAC-d SDU from the MAC-d PDU received from the lower layer and delivers it to the upper layer, such as the RLC layer. At this time, the MAC-d sublayer exchanges the MAC-d PDU with the MAC-e sublayer through the MAC-d flow or exchanges the MAC-d PDU with the physical layer via the DCH. The MAC-d sublayer performs a function, such as transport channel type switching for selectively switching a transport channel according to an amount of data, ciphering/deciphering for performing ciphering or deciphering on the MAC-d PDU, TFC selection for selecting a transport format combination (TFC) suitable for a channel situation, and a C/T Mux for managing a logical channel identifier (C/T) for identifying each dedicated logical channel when several dedicated logical channels are multiplexed and are to be mapped to one DCH or to one MAC-d flow. A C/T field, such as a logical channel identifier, is used only when a logical channel is multiplexed, and added to a header of each MAC-d SDU to form the MAC-d PDU. Presently, the C/T field is defined to have 4 bits. Thus, the maximum number of logical channels that can be multiplexed to one DCH or one MAC-d flow is 16. The structure of the terminal, namely, the transmitting side of the MAC-d sublayer for the HSUPA, is shown in FIG. 4. A MAC-d format when the logical channels are multiplexed is shown in FIG. 5.

The transmitting side MAC-e sublayer forms the MAC-e PDU from the MAC-d PDU (namely, the MAC-e SDU), which is received through the MAC-d flow from the MAC-d sublayer. A receiving side MAC-e sublayer restores the MAC-e SDU from the MAC-e PDU received from the lower layer, namely, the physical layer and delivers it to the upper layer. In this case, the MAC-e sublayer exchanges the MAC-e PDU with the physical layer via the transport channel E-DCH.

The MAC-e sublayer performs a different function depending on whether it belongs to the transmitting side or to the receiving side. First, the transmitting side MAC-e sublayer performs a function of scheduling/priority handling. Preferably, it schedules a data transmission according to uplink/downlink control information and processes the data according to a priority level of the data. The transmitting side MAC-e also performs a function of hybrid ARQ, such as reliably transmitting data at a high speed, and a function of TFRC (Transport Format and Resource Combination) selection, such as transporting a format suitable for a channel situation and resource combination selection.

In particular, the scheduling/priority handling block also serves to form the MAC-e PDU to be transmitted to the physical channel. Specifically, the scheduling/priority handling block concatenates MAC-d PDUs (namely, MAC-e SDUs) received during a certain transmission time interval (TTI) through one MAC-d flow from the MAC-d sublayer according to their lengths. The scheduling/priority block then adds the length information to the MAC-e header, adds a 6-bit transmission sequence number (TSN) of the transport block to be transmitted to the header, and adds a 3-bit PID (Priority ID) for identifying a priority level of the MAC-d flow and a logical channel to the header. Finally, the scheduling/priority handling block adds a 1-bit version flag (VF) to the header to form the MAC-e PDU in order to later support a different MAC-e PDU format.

The structure of the transmitting side MAC-e sublayer and the MAC-e PDU format are shown in FIGS. 6 and 7. In general, a certain type of PDU format is used so that the receiving side receives data as a series of bit streams (e.g., 0, 1, 0, 1). Without determining a format, the receiving side cannot interpret each bit for what it means. In the HSUPA, the MAC-e PDU format is used with some restrictions, as shown in FIG. 7. The restrictions are explained below.

First, one MAC-e PDU is transmitted during one TTI. Thus, a TSN is added to every MAC-e PDU. Second, one MAC-e PDU includes only the data of logical channels which belong to the same MAC-d flow and has the same priority level. Thus, the PID is interpreted as a MAC-d flow ID+logical channel priority.

Third, the data of several logical channels are multiplexed to one MAC-e PDU in order to obtain multiplexing gain. In general, the length of the SDU can be different for each logical channel, so information indicating the length of each SDU is added to the header.

Of the above conditions, the length of the header of the MAC-e PDU is varied due to the third condition. The length information of the SDU includes three fields: a 3-bit SID (Size Index) field for indicating a length of each SDU, a 7-bit N field for indicating the number of SDUs having the length of the SID, and a 1-bit F (Flag) field for indicating whether the next field is the SID length information or a MAC-e SDU. Preferably, the length information of the SDU includes the three fields of SID, N and F, and its size (length) increases to correspond with the number of length types of the SDU.

In order to wirelessly transmit a certain PDU via the physical channel, the PDU must have a determined length required for coding, modulation and spreading performed in the physical channel. Thus, the MAC-e sublayer generates a PDU suitable for a size required by the physical channel by padding an end portion of the PDU. Such padding portion serves to fit the size of the PDU and does not contain any information. When the receiving side receives the PDU, it discards the padding portion.

The receiving side interprets the received bit streams according to the format shown in FIG. 7. Preferably, the receiving side interprets the bit streams starting from the VF (1 bit), PID (3 bits), TSN (6 bits), SID (3 bits), N (7 bits), F (1 bit), and interprets the header until the F field indicates that the next portion is the SDU. When the F field indicates that the next portion is the SDU, the receiving side, starting from the next bits, disassembles the SDU according to the length information of the SDU. Preferably, the SDU is disassembled according to the length and the number of SDUs from the combination of SID, N and F. After extracting the SDU, a remaining portion is discarded as a padding portion.

Notably, if the MAC-e SDU has the same length, the length information of one SDU can be used to inform the lengths of other SDUs despite the use of several logical channels for transmitting data. With reference to FIG. 7, the first SDU length information, specifically, the combination of SID1, N1 and F1, informs the data length of both a first logical channel (C/T=1) and a second logical channel (C/T=2), and Kth SDU length information, namely, the combination of SIDK, NK and FK informs the data length from the fourth logical channel (C/T=4) to the kth logical channel (C/T=k). Preferably, the MAC-e sublayer does not process the data by logical channel, but processes the data by the size of the MAC-e SDU.

The structure of the receiving side MAC-e sublayer is shown in FIG. 8. The HARQ block of the receiving side corresponds to the HARQ block of the transmitting side, and each HARQ process of the HARQ block performs an SAW (Stop And Wait) ARQ function with the transmitting side. When the receiving side receives one MAC-e PDU through the HARQ process, it reads the VF of the header of the MAC-e PDU to check its version, and checks the next PID field to recognize which MAC-d flow and which priority level the received PDU corresponds to. This operation is performed in a re-ordering queue distribution block. The PDU is then delivered to a reordering block indicated by the PID. The reordering function of the receiving side is notable compared with the transmitting side. That is, the MAC-e sublayer receives the MAC-e PDUs through the HARQ out-of-sequence, but the RLC layer (namely, the upper layer following the MAC-d sublayer) requests in-sequence delivery. Accordingly, the MAC-e sublayer performs reordering to sequentially deliver the non-sequentially received PDUs to the upper layer.

To perform the reordering, each PID has a reordering buffer. Although a certain PDU is successfully received, if the TSN is not in sequence, the PDU is temporarily stored in the buffer. Then, when an in-sequence delivery of the PDU is possible, it is delivered to the upper layer. A portion from the TSN, except for the VF and the PID of the header of the PDU, is stored in the reordering buffer. Thereafter, when the PDU is delivered to a disassembly block, the SDU is disassembled upon checking the SDU length information of the SID, N and F, and then delivered to the upper MAC-d sublayer. Preferably, only the MAC-e SDU (MAC-d PDU) is delivered through the MAC-d flow.

In the HSUPA, the structure of the MAC-d sublayer of the UTRAN (the receiving side) is similar to the MAC-d sublayer of the terminal (the transmitting side). Especially, portions of the receiving side related to the HSUPA perform the functions of the transmitting side, but in opposite order. As for the operations related to the DCH, the only difference is that the terminal performs the TFC selection, while the UTRAN performs the scheduling/priority handling. Referring to the HSUPA, regarding the MAC-d PDUs received through the MAC-d flow from the MAC-e sublayer, the C/T Mux block reads the C/T field to detect which logical channel the data (i.e., MAC-d PDUs) belongs to, removes the C/T field, extracts the MAC-d SDU and delivers it via a channel indicated by the C/T field to the upper RLC layer. As aforementioned, the C/T field does not always exist, but exists when logical channels are multiplexed. If logical channels are not multiplexed, the received MAC-d PDU is the MAC-d SDU, so the C/T Mux block delivers such to the RLC layer. FIG. 9 illustrates a structure of the MAC-d sub-layer of the UTRAN, the receiving side in the HSUPA.

In the related art, numerous overheads are added in constructing the MAC-e PDU. Especially, when logical channels are multiplexed, the 4-bit C/T field (namely, the logical channel identifier) is added to each MAC-e SDU. Thus, when numerous MAC-e SDUs are included in the MAC-e PDU, overheads of the MAC layer are considerably increased. Such increase in the overheads leads to the reduction of throughput, therefore failing to meet a desired transmission rate required for high speed data communication.

SUMMARY OF THE INVENTION

The present invention is directed to reducing overheads of a MAC-e PDU.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for generating a protocol data unit in a wireless communication system, the method comprising receiving in a first layer a plurality of service data units from a second layer, discriminating the plurality of service data units into groups based on a logical channel the service data units are received through, and generating the protocol data unit in the first layer, wherein the protocol data unit comprises a header, the plurality of service data units from at least one group and a logical channel identifier for each group, wherein each logical channel identifier identifies the logical channel each group of service data units is received through.

Preferably, the service data units of each group have the same size. The discrimination of the plurality of service data units occurs in the first layer. Alternatively, the discrimination of the plurality of service data units occurs in the second layer.

The logical channel identifier is added to the header. Alternatively, the logical channel identifier is added to a payload portion of the protocol data unit. The protocol data unit is transmitted to a network.

Preferably, the first layer is a MAC-e layer. The second layer is a MAC-d layer. The logical channel identifier is a C/T field. The plurality of service data units is a plurality of MAC-d SDUs.

Preferably, the header (MAC-e header) comprises length information comprising a size of the plurality of service data units received through each logical channel, wherein the length information comprises at least one of an SID field, an N field, and an F field.

In accordance with another embodiment of the present invention, a method for generating a protocol data unit in a wireless communication system comprises receiving in a first layer at least one service data unit from a second layer and generating the protocol data unit in the first layer, wherein the protocol data unit comprises a header, the at least one service data unit and a logical channel identifier, wherein the logical identifier identifies the logical channel the at least one service data unit is received through.

The logical channel identifier is added to the header. Alternatively, the logical channel identifier is added to a payload portion of the protocol data unit. The protocol data unit is transmitted to a network.

Preferably, the first layer is a MAC-e layer. The second layer is a MAC-d layer. The logical channel identifier is a C/T field. The at least one service data unit is at least one MAC-d SDU.

Preferably, the header (MAC-e header) comprises length information comprising a size of the at least one service data units received through the logical channel, wherein the length information comprises at least one of an SID field, an N field, and an F field.

In accordance with another embodiment of the present invention, a mobile terminal for generating a protocol data unit in a wireless communication system comprises means for receiving in a first layer a plurality of service data units from a second layer, means for discriminating the plurality of service data units into groups based on a logical channel the service data units are received through, and means for generating the protocol data unit in the first layer, wherein the protocol data unit comprises a header, the plurality of service data units from at least one group and a logical channel identifier for each group, wherein each logical channel identifier identifies the logical channel each group of service data units is received through.

Preferably, the service data units of each group have the same size. The discrimination of the plurality of service data units occurs in the first layer. Alternatively, the discrimination of the plurality of service data units occurs in the second layer.

The logical channel identifier is added to the header. Alternatively, the logical channel identifier is added to a payload portion of the protocol data unit. The protocol data unit is transmitted to a network.

Preferably, the first layer is a MAC-e layer. The second layer is a MAC-d layer. The logical channel identifier is a C/T field. The plurality of service data units is a plurality of MAC-d SDUs.

Preferably, the header (MAC-e header) comprises length information comprising a size of the plurality of service data units received through each logical channel, wherein the length information comprises at least one of an SID field, an N field, and an F field.

In accordance with another embodiment of the present invention, a mobile terminal for generating a protocol data unit in a wireless communication system comprises means for receiving in a first layer at least one service data unit from a second layer and means for generating the protocol data unit in the first layer, wherein the protocol data unit comprises a header, the at least one service data unit and a logical channel identifier, wherein the logical identifier identifies the logical channel the at least one service data unit is received through.

The logical channel identifier is added to the header. Alternatively, the logical channel identifier is added to a payload portion of the protocol data unit. The protocol data unit is transmitted to a network.

Preferably, the first layer is a MAC-e layer. The second layer is a MAC-d layer. The logical channel identifier is a C/T field. The at least one service data unit is at least one MAC-d SDU.

Preferably, the header (MAC-e header) comprises length information comprising a size of the at least one service data units received through the logical channel, wherein the length information comprises at least one of an SID field, an N field, and an F field.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to reducing overheads of a MAC-e PDU by effectively processing a logical channel identifier (C/T field) added to each MAC-d SDU. Preferably, a MAC-e sublayer processes data not according to SDU size, but according to logical channels. When the MAC-e sublayer processes data according to logical channels, it is no longer necessary to add the logical channel identifier (C/T field) to each MAC-d SDU. Thus, one common logical channel identifier can be added to every MAC-d SDU transmitted via one logical channel. Accordingly, overheads due to the logical channel identifiers are considerably reduced.

Figure 1:
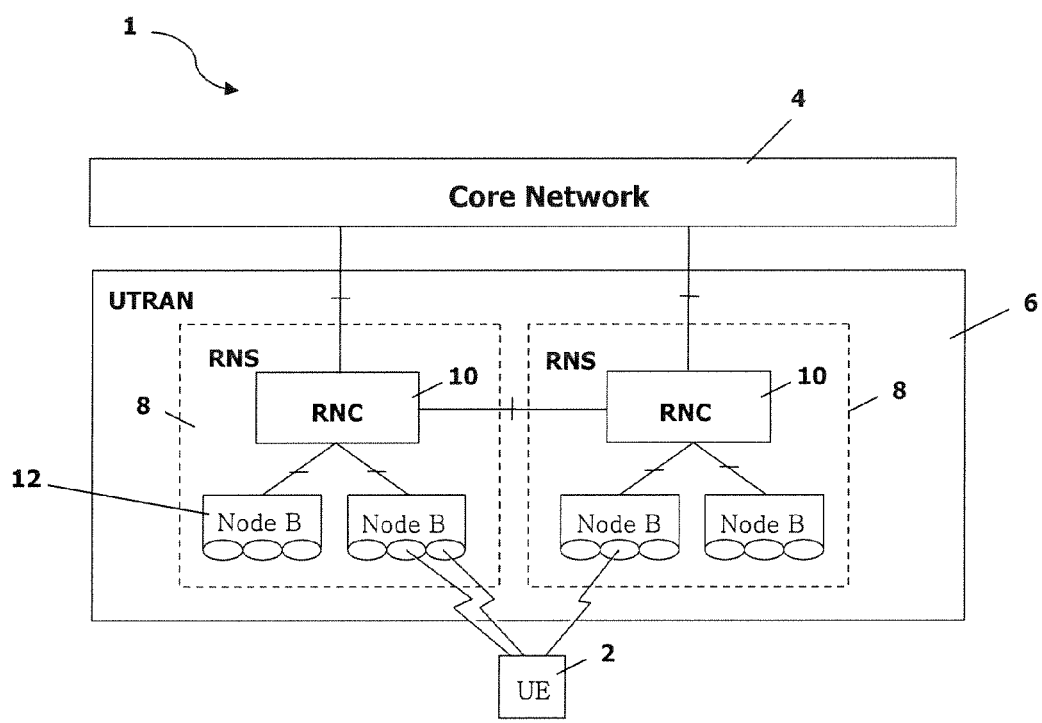
FIG. 1 illustrates a related a general UMTS network structure.
Figure 2:
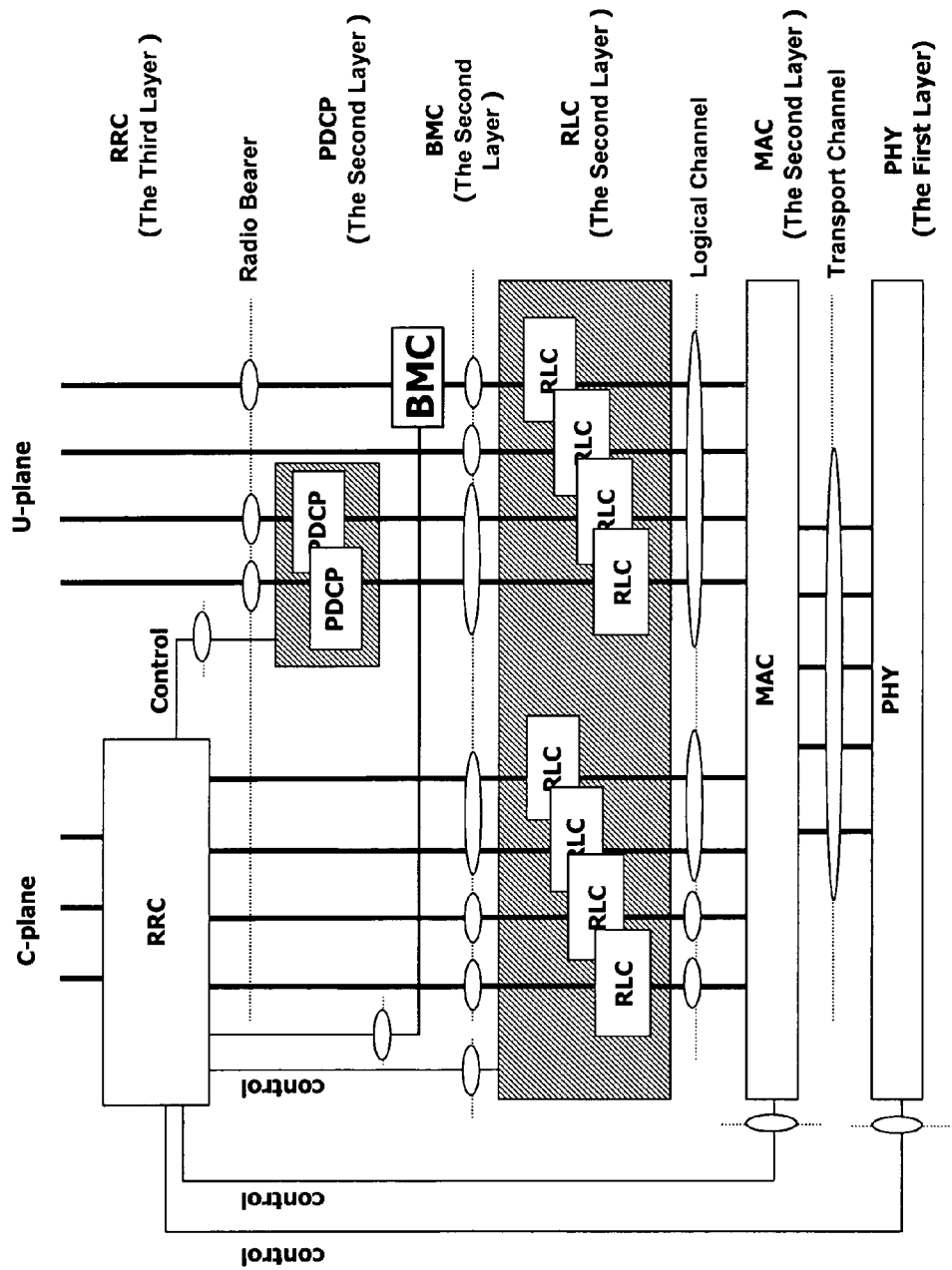
FIG. 2 illustrates a radio protocol architecture used in an UMTS.
Figure 3:
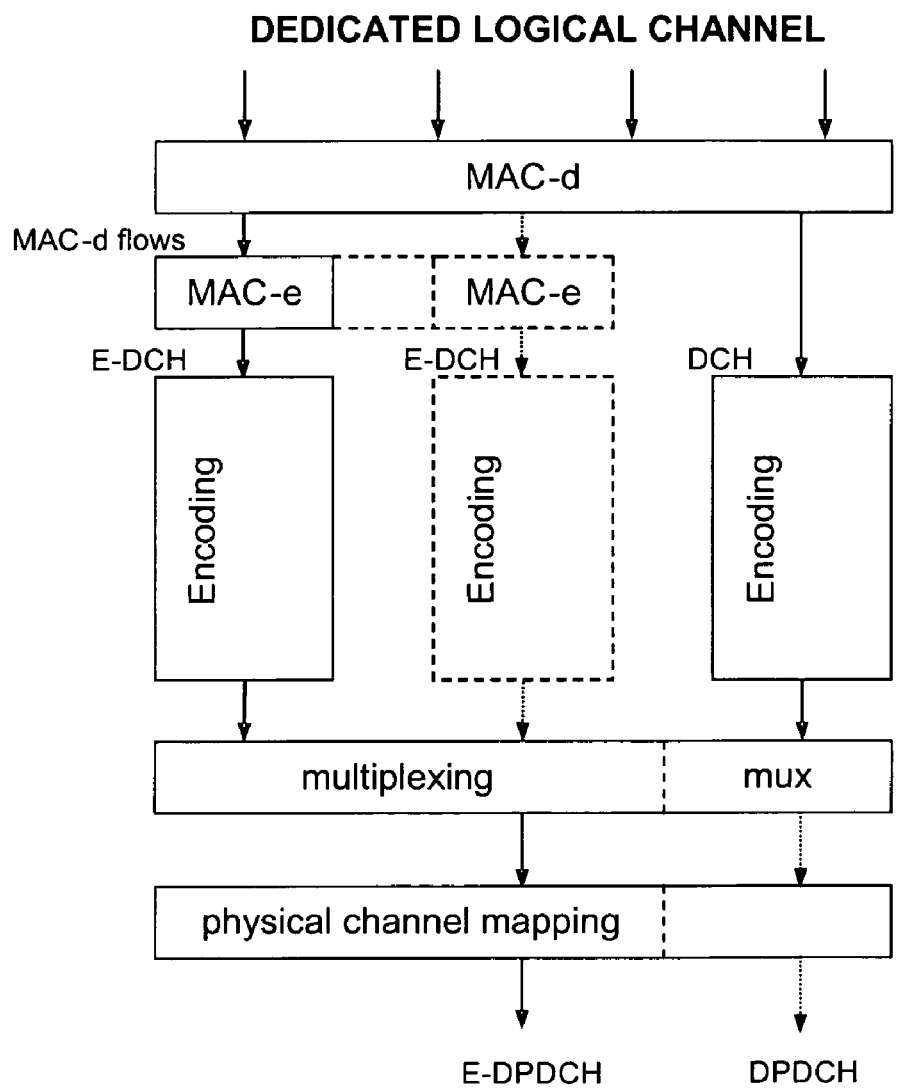
FIG. 3 illustrates a MAC layer of a HSUPA.
Figure 4:
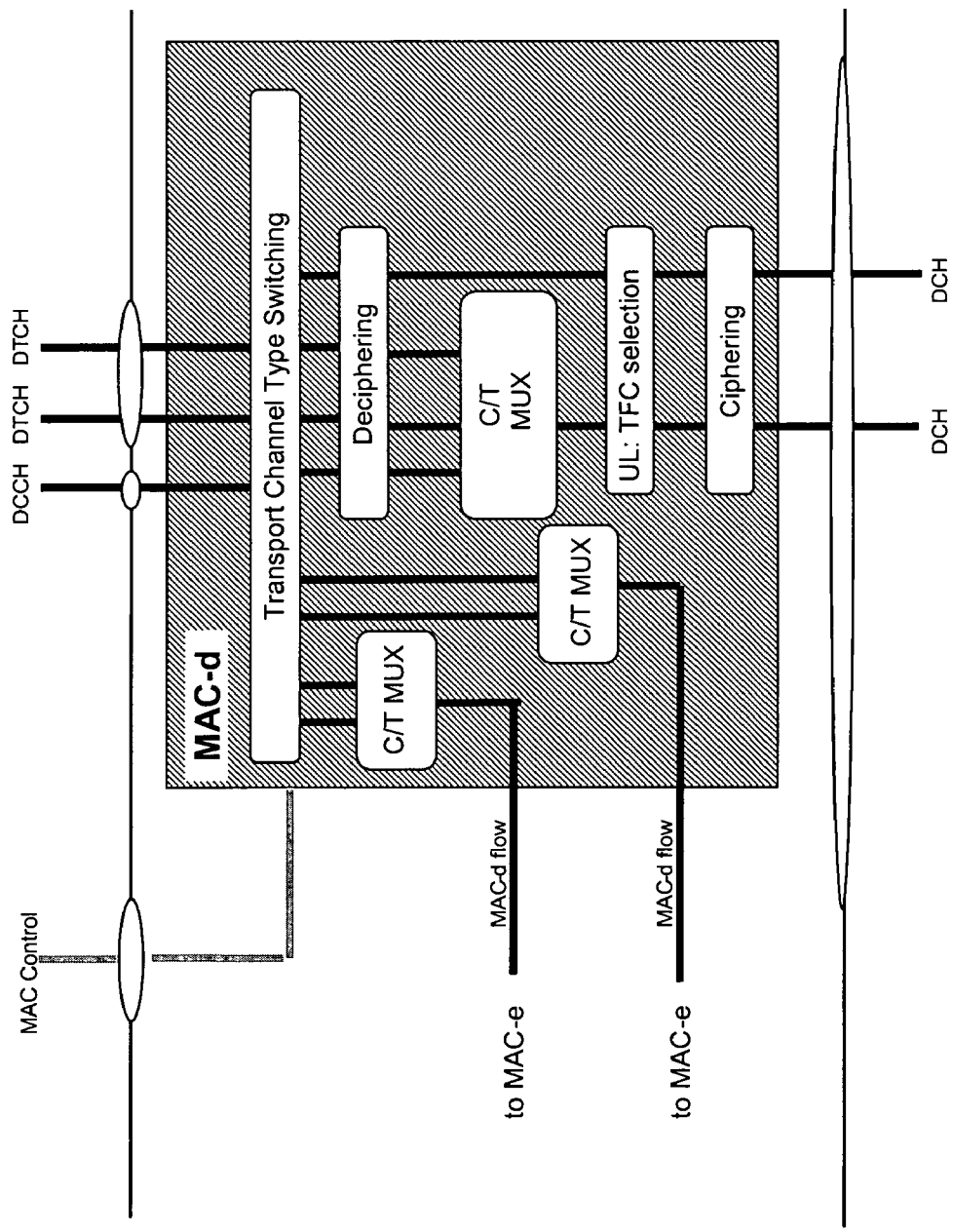
FIG. 4 illustrates a structure of a MAC-d sublayer of a terminal.
Figure 5:
FIG. 5 illustrates a format of a MAC-d PDU in multiplexing logical channels.
Figure 6:
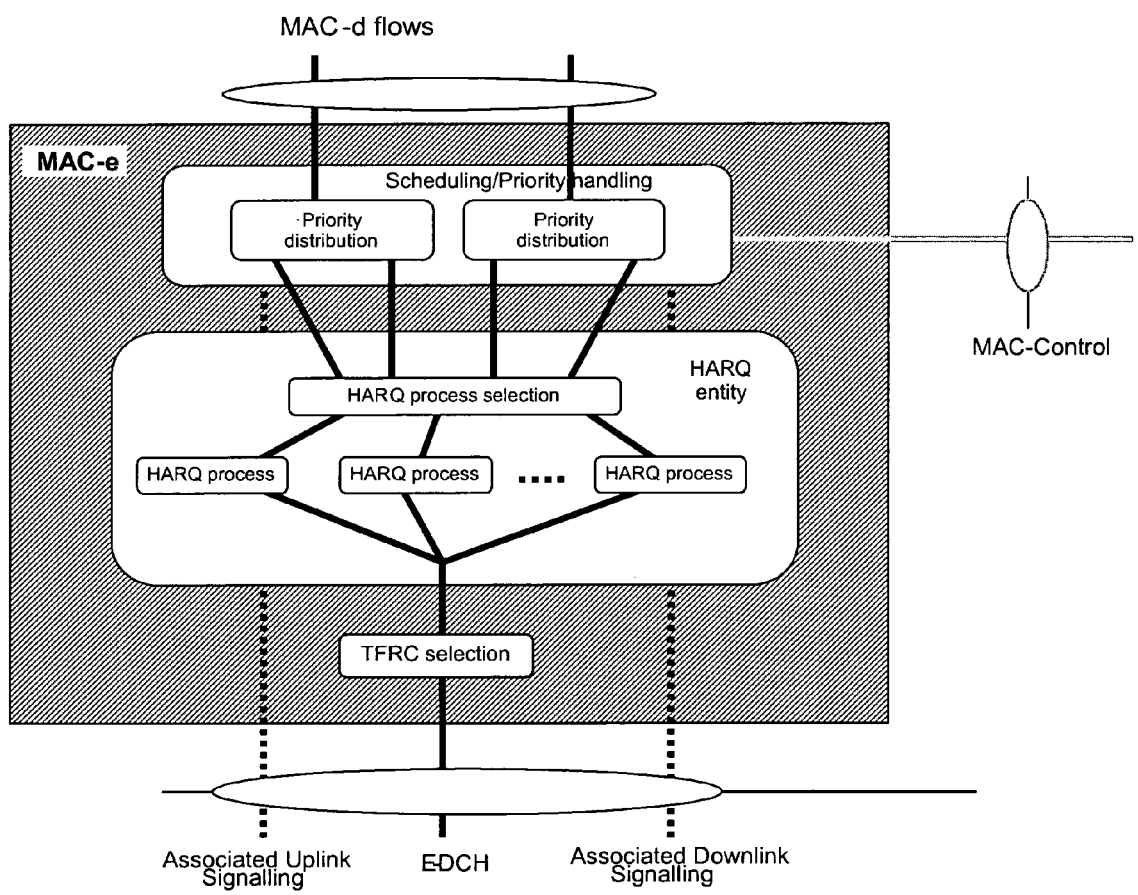
FIG. 6 illustrates a structure of a MAC-e sublayer of a transmitting side.
Figure 7:
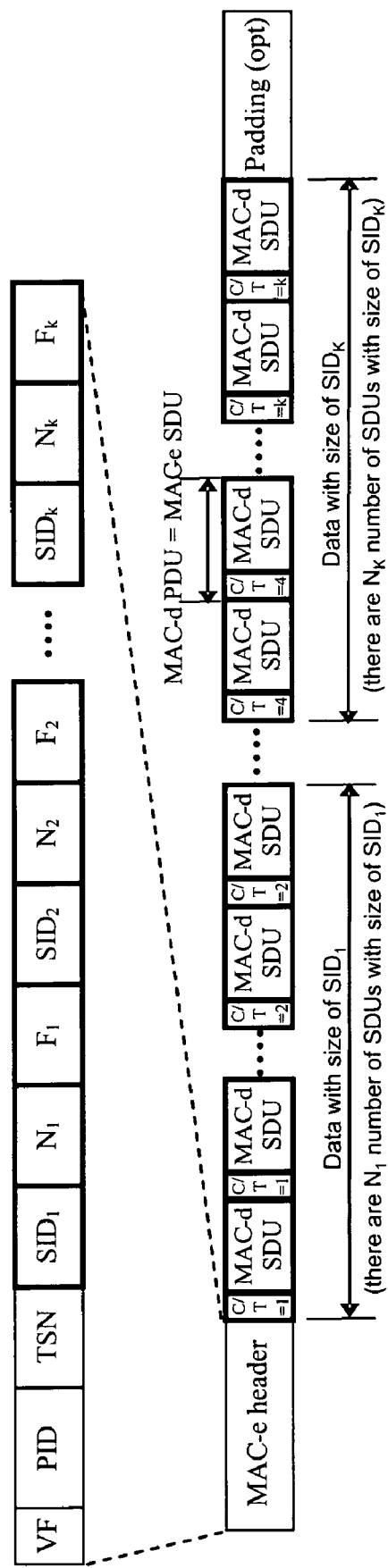
FIG. 7 illustrates a related art format of a MAC-e PDU.
Figure 8:
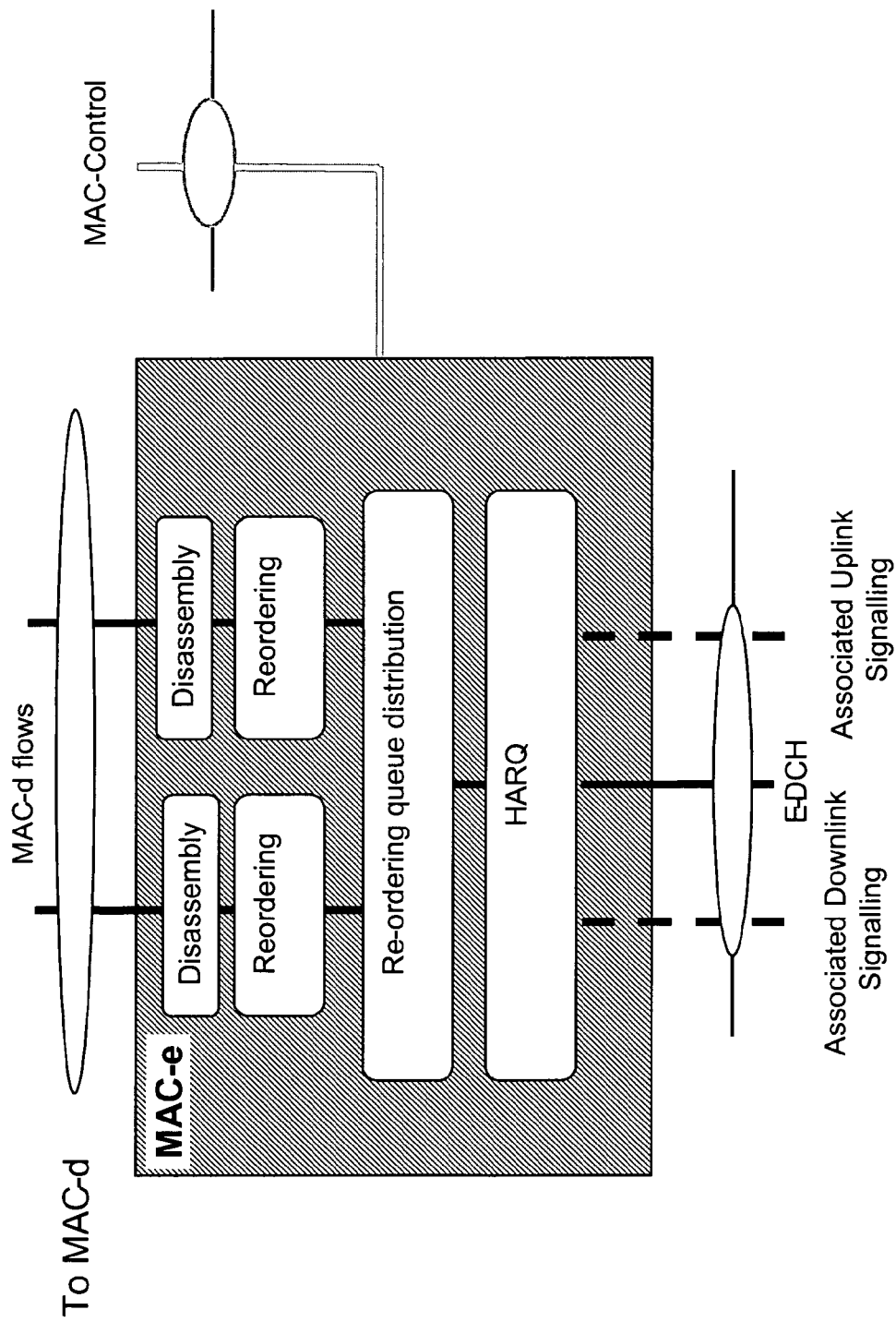
FIG. 8 illustrates a structure of a MAC-e sublayer of a receiving side.
Figure 9:
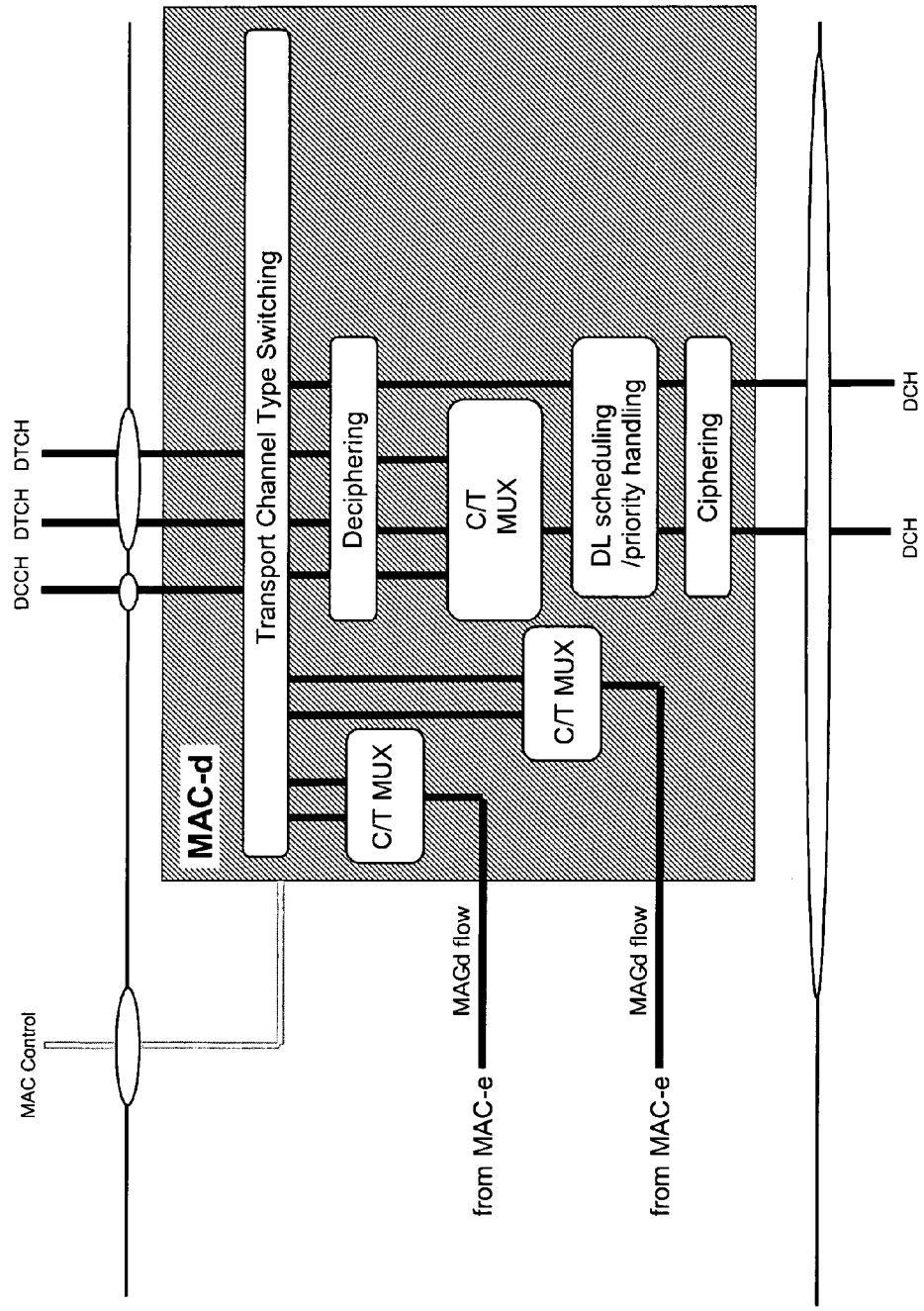
FIG. 9 illustrates a structure of a MAC-d sublayer of the UTRAN.
Figure 10A:
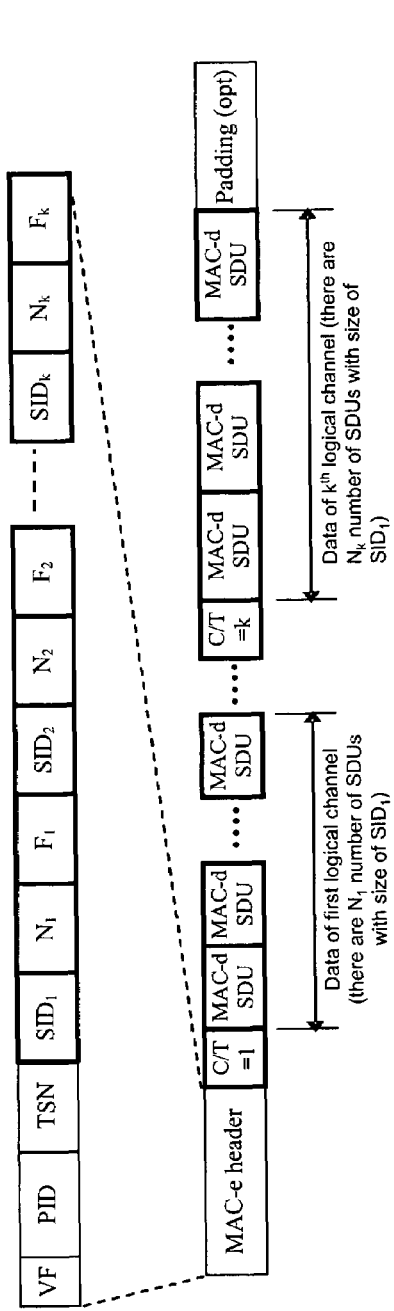
FIGS. 10A and 10B illustrate formats of a MAC-e PDU, in accordance with one embodiment of the present invention.
Figure 10B:
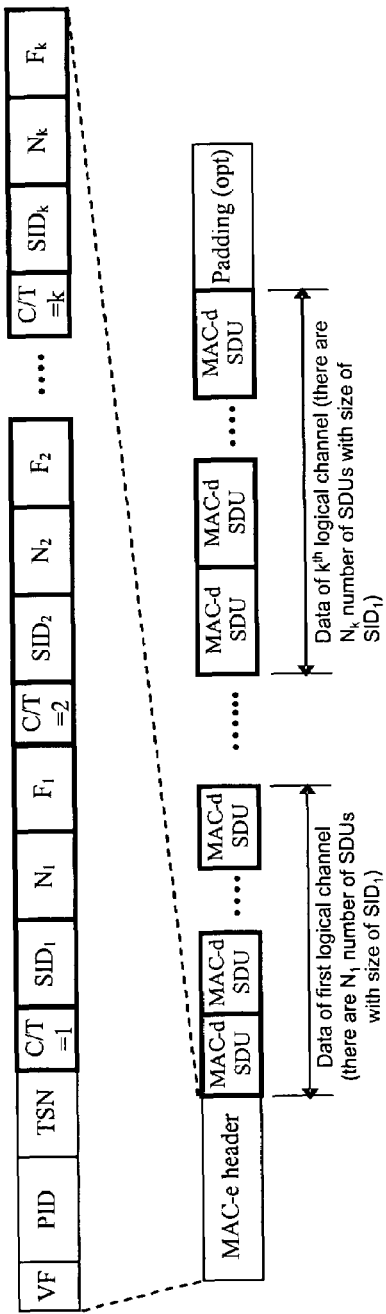

FIGS. 10A and 10B illustrate exemplary formats of a MAC-e PDU in accordance with a preferred embodiment of the present invention. The MAC-e PDU formats may differ depending on where the common logical channel identifier is added. Preferably, the common logical channel identifier may be added to a payload portion of the MAC-e PDU as shown in FIG. 10A, or may be added to a header as shown in FIG. 10B.

Although only two formats are shown in FIGS. 10A and 10B, other formats can be formed according to how the position of the logical channel identifier is defined. Preferably, in case of adding the logical channel identifier to the payload, it may be added after the logical channel data, rather than before the data. In case of adding the logical channel identifier to the header, it may be added between the SID and N, or between N and F, or after F, not only before the SID, N and F. In any case, the logical channel identifier is added once with respect to one logical channel, and its position must be previously defined so that the receiving side can decode it properly.

Preferably, when using one or more MAC-e PDU formats in accordance with the present invention, the following points are noted. First, the SDU length information (SID, N, F) is added to a header for each logical channel regardless of the size of the SDU. Preferably, the SDU length information is added to logical channel data even though the logical channel data have the same size. Considering that a total of 11 bits of SDU length information are to be added so as to correspond to the number of logical channels despite the SDUs being the same size, the present invention initially appears to be ineffective. However, because the 4-bit C/T field is reduced for every MAC-e SDU, if four or more MAC-e SDUs belong to one logical channel, overhead production will be minimized.

Second, the size of the SDU indicated by the SID corresponds to the size of the MAC-d SDU excluding the C/T field. Since the SDU size indicates only the MAC-d SDU size, when the transmitting side or the receiving side adds or interprets the SID, a value excluding the C/T field is used.

Third, because the C/T field is added or separated, the function of the C/T Mux block in the MAC-d sublayer and the function of the scheduling/priority handling block or the disassembly block in the MAC-e sublayer is affected. Specifically, in the present invention, one C/T field is added to every MAC-d SDU which belongs to one logical channel and is transmitted together through the MAC-d flow. The scheduling/priority handling block of the transmitting side MAC-e sublayer combines the received MAC-d SDUs by logical channel and constructs a MAC-e PDU by adding the logical channel identification information to a determined position.

When the disassembly block of the receiving side MAC-e sublayer transmits data to the MAC-d sublayer through the MAC-d flow, it transmits the data in units of MAC-d SDUs, not in units of MAC-d PDUs. The MAC-e sublayer then delivers one C/T field with respect to the MAC-d SDUs. The MAC-d SDUs are delivered together in order to discriminate logical channels of the MAC-d SDUs. Upon receipt, the C/T Mux of the receiving side MAC-d sublayer transfers the MAC-d SDUs, which have been received together, to a logical channel indicated by the C/T field, which has also been received therewith.

As so far described, the system and method for configuring data of the MAC layer in accordance with the present invention has the following advantages. Because only one logical channel identifier is added to the data belonging to one logical channel when constructing a MAC-e PDU, overheads of the MAC-e PDU are reduced. Such reduction of the PDU overheads increases the data throughput, which is advantageous for a high-speed data communication system such as the HSUPA.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for processing data units of a wireless communication system comprising a terminal and a radio access network, the method performed by the terminal comprises:
   receiving a plurality of service data units from a first layer;
   concatenating the plurality of received service data units;
   adding a header to the concatenated service data units to generate a protocol data unit, and
   delivering the generated protocol data unit to a second layer,
   wherein the generated protocol data unit for High Speed Uplink Packet Access (HSUPA) comprises:
      the concatenated plurality of service data units classified into at least two groups, each group having service data units belonging to each logical channel, and service data units belonging to one logical channel having a same size,
      each logical channel identifier information included for each group, and
      each length information included for each group, indicating a size of the service data units belonging to each logical channel excluding a size of each logical channel identifier information,
   wherein each logical channel is located between a radio link control (RLC) layer and a medium access control (MAC) layer,
   wherein the MAC layer comprises the first layer and a third layer,
   wherein the first layer is for a dedicated channel (DCH) and the third layer is for an enhanced dedicated channel (E-DCH),
   wherein the concatenation of the plurality of received service data units is performed by the third layer,
   wherein each logical channel identifier information is included in the header of the protocol data unit, and
   wherein the header of the protocol data unit is added by the third layer.

2. The method of claim 1, wherein each length information comprises size information (SID) indicating a size of one service data unit.

3. The method of claim 1, wherein the generated protocol data unit is delivered to the second layer via the E-DCH.

4. The method of claim 3, wherein each length information further comprises number information (N) indicating a number of the service data units belonging to each logical channel.

5. The method of claim 1, wherein the steps are performed by a medium access control (MAC) layer.

6. The method of claim 1, wherein each length information are included in the header of the generated protocol data unit.

7. The method of claim 6, wherein each length information is included in the header of the generated protocol data unit regardless of the size of the service data units belonging to each logical channel.

8. The method of claim 1, wherein the first layer is a MAC-d layer and the second layer is a physical layer.

9. The method of claim 1, wherein the third layer is a MAC-e layer.

10. A method for processing data units of a wireless communication system comprising a terminal and a radio access network, the method performed by the network comprises:
    receiving a protocol data unit including a header and a plurality of concatenated service data units from a second layer in a receiving unit;
    reading the header of the received protocol data unit in a reading unit;
    disassembling the plurality of concatenated service data units; and
    delivering the disassembled service data units in a disassembling unit to a first layer in a delivering unit,
    wherein the received protocol data unit for High Speed Uplink Packet Access (HSUPA) comprises:
       the plurality of concatenated service data units classified into at least two groups in the terminal, each group having service data units belonging to each logical channel, and service data units belonging to one logical channel having a same size,
       each logical channel identifier information included for each group, and
       each length information included for each group, indicating a size of the service data units belonging to each logical channel excluding a size of each logical channel identifier information,
    wherein each logical channel is located between a radio link control (RLC) layer and a medium access control (MAC) layer
    wherein the MAC layer comprises the first layer and a third layer,
    wherein the first layer is for a dedicated channel (DCH) and the third layer is for an enhanced dedicated channel (E-DCH),
    wherein the disassembling of the plurality of concatenated service data units is performed by the third layer,
    wherein each logical channel identifier information is included in the header of the protocol data unit, and
    wherein the header of the protocol data unit is read by the third layer.

11. The method of claim 10, wherein each length information comprises size information (SID) indicating a size of one service data unit.

12. The method of claim 10, wherein the protocol data unit is received via the E-DCH.

13. The method of claim 12, wherein each length information further comprises number information (N) indicating a number of the service data units belonging to each logical channel.

14. The method of claim 10, wherein the steps are performed by a medium access control (MAC) layer.

15. The method of claim 10, wherein each length information are included in the header of the protocol data unit.

16. The method of claim 15, wherein each length information is included in the header of the protocol data unit regardless of the size of the service data units belonging to each logical channel.

17. The method of claim 10, wherein the first layer is a MAC-d layer and the second layer is a physical layer.

18. The method of claim 10, wherein the third layer is a MAC-e layer.

* * * * *